United States Patent [19]
Hirt

[11] 3,899,628
[45] Aug. 12, 1975

[54] ELECTRIC ARC FURNACE WITH AUXILIARY BURNERS

[75] Inventor: John H. Hirt, Monterey Park, Calif.

[73] Assignee: Southern California Gas Co., Los Angeles, Calif.

[22] Filed: Sept. 4, 1973

[21] Appl. No.: 393,719

[52] U.S. Cl. .................................................. 13/2
[51] Int. Cl. ............................................ H05b 7/00
[58] Field of Search ...................................... 13/2, 9

[56] References Cited
UNITED STATES PATENTS

| | | | |
|---|---|---|---|
| 3,136,835 | 6/1964 | Dillon et al. | 13/9 |
| 3,197,539 | 7/1965 | Hinds | 13/2 X |
| 3,237,930 | 3/1966 | Hofmann | 13/2 |
| 3,303,257 | 2/1967 | Fujiwara et al. | 13/9 |
| 3,422,206 | 1/1969 | Baker et al. | 13/2 UX |

Primary Examiner—R. N. Envall, Jr.
Attorney, Agent, or Firm—Christie, Parker & Hale

[57] ABSTRACT

In a furnace having a hearth, a side wall surrounding the hearth, and a roof over the side wall to define a generally cylindrical enclosure with a vertical central axis, a plurality of electrodes extending vertically through the roof into the center of the enclosure, and an exhaust at the top of the enclosure, one or more auxiliary burners along the side wall are oriented in a downward and radially inward direction that intersects the central axis. The burners, which are preferably recessed outwardly from the surface of the furnace side wall, each comprise an elongated, conical passage having an outlet opening into the furnace enclosure and a smaller inlet to which a combustible mixture is supplied; a pilot unit is located near the inlet. A single source of oxygen, such as an air blower, is employed for a plurality of burners and a carbonaceous fuel supplied to each burner is individually regulated responsive to the flow of oxygen to maintain a fuel rich combustible mixture with a constant fuel-oxygen ratio.

15 Claims, 6 Drawing Figures

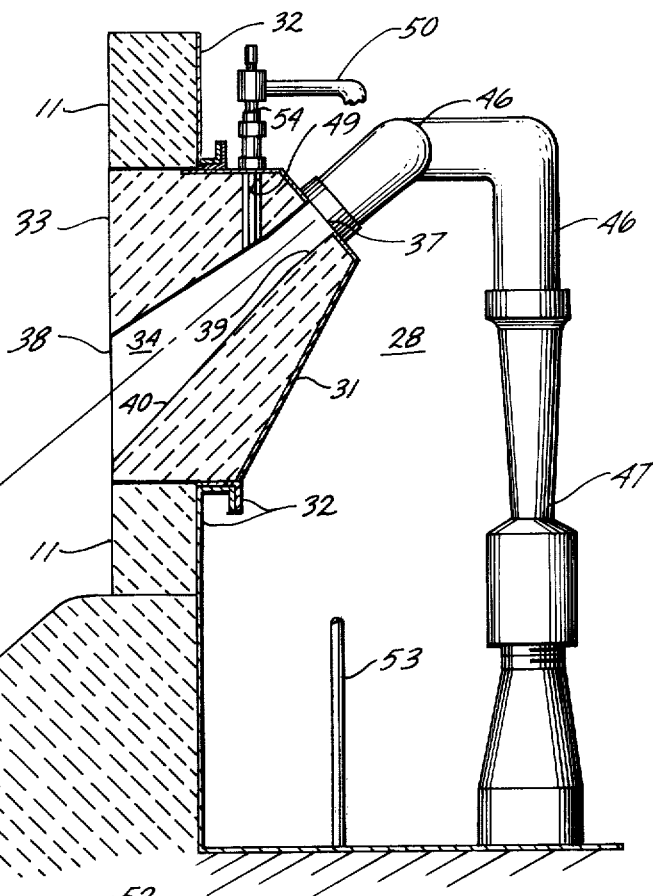
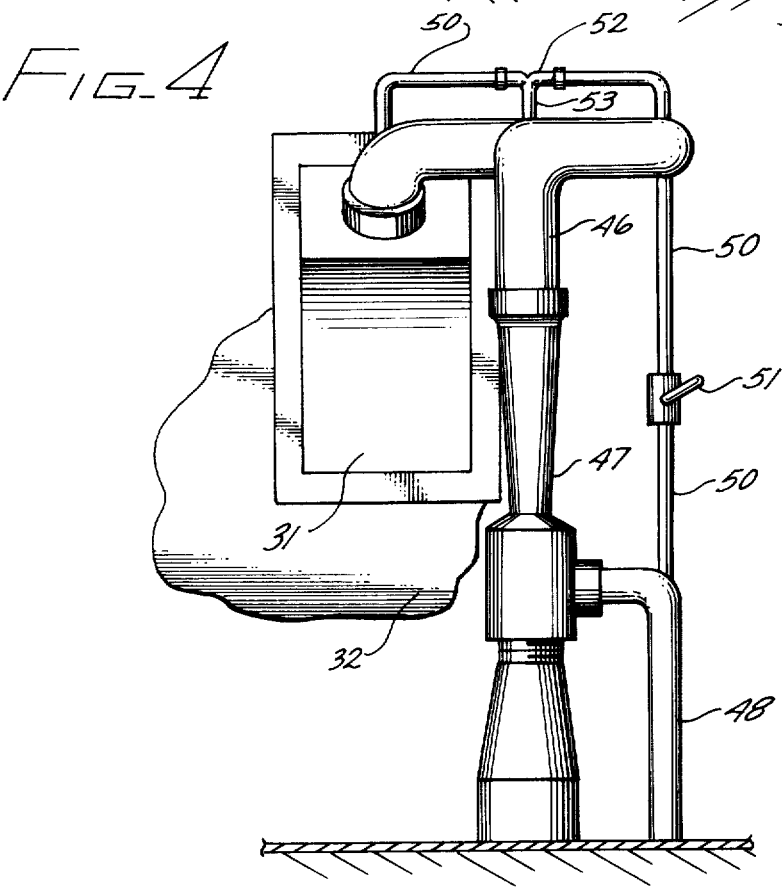

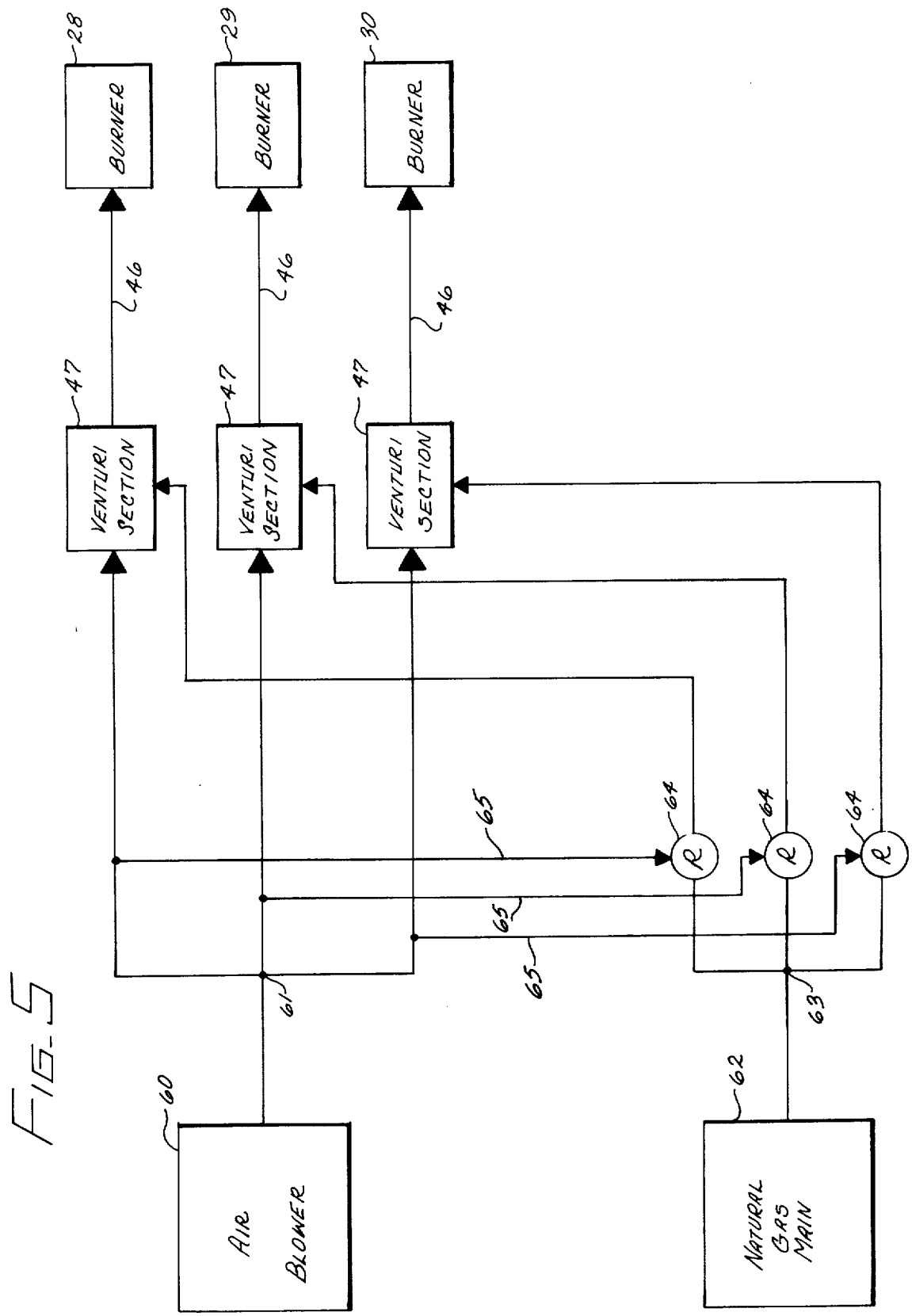

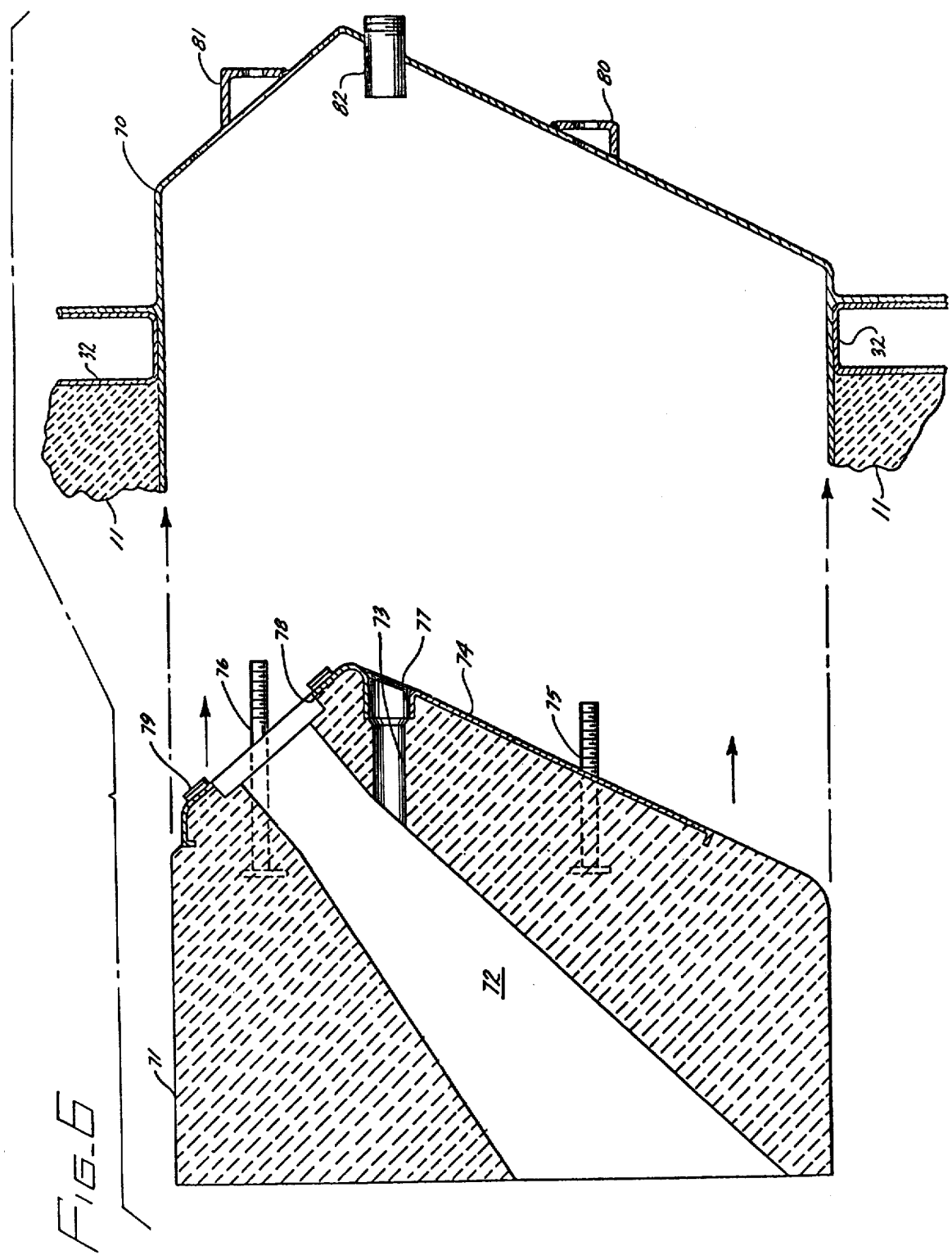

ELECTRIC ARC FURNACE WITH AUXILIARY BURNERS

BACKGROUND OF THE INVENTION

This invention relates to electric arc furnaces for melting and refining scrap metal and, more particularly, to auxiliary burners for an electric arc furnace.

A well known technique to reduce the total cost of power consumption and/or the processing time in an electric arc furnace is to use auxiliary burners to augment the electrically generated heat with heat generated by a carbonaceous fluid fuel, such as natural gas. The objective is to heat the metal charge in the furnace with the auxiliary burners in the most efficient manner without appreciably oxidizing the electrodes or the charge.

La Bate U.S. Pat. No. 2,927,142 discloses an electric arc furnace in which a pair of portable burners are directed into the interior of the furnace through its doors in a horizontal, generally circumferential, direction. La Bate teaches a circumferential orientation of the burners tends to cause their heat to wash the entire outer surface of the unmelted charge.

Hofmann U.S. Pat. No. 3,237,930 discloses an electric arc furnace in which oil-oxygen burners are mounted on the roof of the furnace and directed from there downward in a vertical direction into the furnace. Hofmann teaches that it is preferable to use the burners to melt the charge and the electrodes to refine the charge by alternatively introducing the burners and the electrodes into the furnace through the same set of apertures in the roof.

Stewart U.S. Pat. No. 3,249,423 discloses an electric arc furnace in which a portable natural gas burner is directed through a door into the interior of the furnace in a horizontal, radial direction. Stewart teaches that oxidation of the electrodes and the charge is prevented by maintaining a positive pressure inert nitrogen atmosphere in the furnace during operation of the burner.

Estes U.S. Pat. No. 3,459,867 discloses an electric arc furnace in which oxy-fuel burners are mounted in a specially constructed refractory ring located between the side wall and roof of the furnace. The burners are oriented in a downward direction with a tangential component that causes the flames emanating from the burner to pass outwardly of and around the electrodes. Estes teaches that this burner orientation avoids flame contact with the electrodes and improves heating efficiency by directing the flame front around the metal charge in a circumferential and tangential path.

SUMMARY OF THE INVENTION

According to one aspect of the invention, an ignited combustible mixture is directed into the interior of an electric arc furnace in a downward and radially inward direction that preferably intersects the central axis of the furnace in its hearth. In this manner, the scrap metal charge in the furnace is heated from the bottom up by direct contact with the flame front. The charge is more uniformly and efficiently heated and the tendency to form bridging structures between pieces of scrap during heating is reduced.

In the preferred embodiment, a combustible mixture is directed into the furnace by burners recessed outwardly of the surface of the furnace side wall. An elongated conical passage is formed along a longitudinal axis in a refractory block that replaces part of the shell of the furnace side wall. The passage has an outlet that opens into the interior of the furnace and a smaller, outwardly space inlet where the mixture is ignited.

According to another aspect of the invention, an electric arc furnace having an exhaust conduit at the top of the furnace enclosure is provided with auxiliary burners at the bottom of the furnace enclosure above the hearth. The heat generated by the burners sweeps upward through the space between scrap pieces, thereby promoting more uniform and efficient heating.

According to another aspect of the invention, a plurality of auxiliary burners are supplied oxygen from a single source and fuel from a single source. The fuel for each burner is individually uniformly pre-mixed with oxygen and individually regulated responsive to the flow of oxygen to the corresponding burner so as to maintain a constant predetermined fuel-oxygen ratio, despite variations in the distribution of oxygen to the burners.

BRIEF DESCRIPTION OF THE DRAWINGS

The features of specific embodiments of the best mode contemplated of carrying out the invention are illustrated in the drawings, in which:

FIG. 3 is a side sectional view of one of the burners of the furnace of FIG. 1 taken along line 3—3 in FIG. 2;

FIG. 4 is a back view of the burner of FIG. 3;

FIG. 5 is a schematic block diagram of the fuel preparation apparatus for the burners in the furnace of FIG. 1; and FIG. 6 is a side sectional view of a modified version of the burner of FIG. 3 in disassembled condition.

DETAILED DESCRIPTION OF THE SPECIFIC EMBODIMENTS

Figure 1:
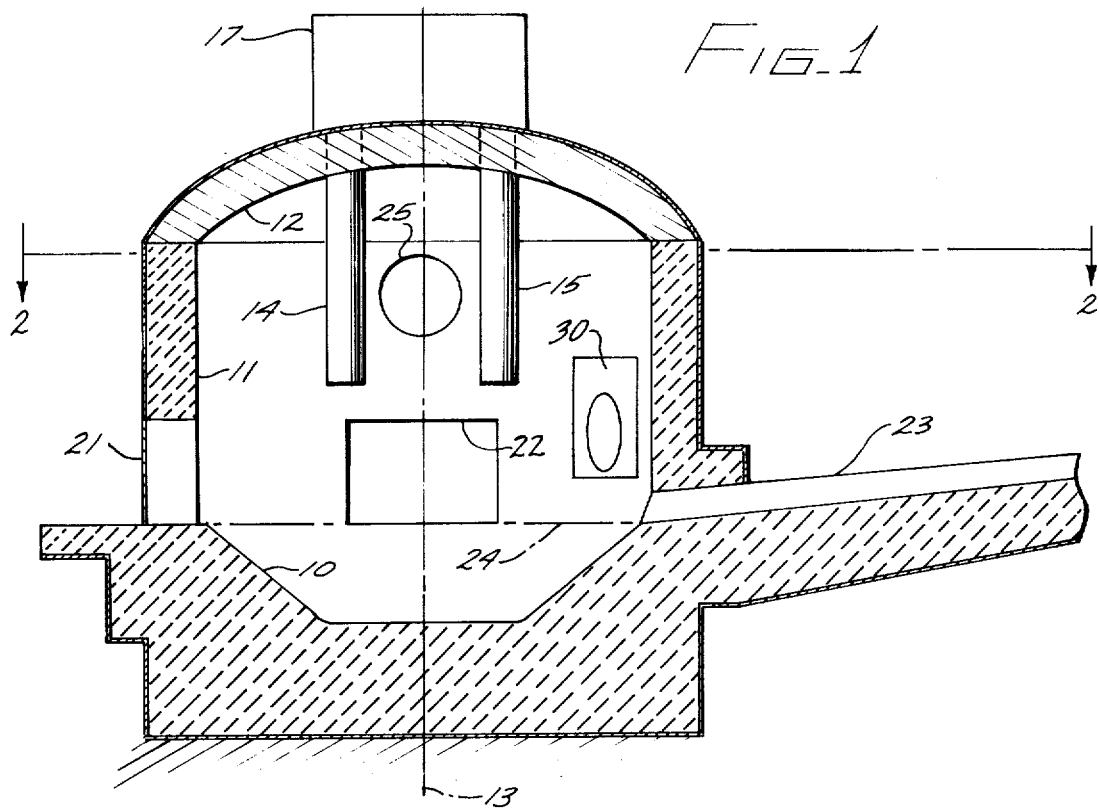
FIG. 1 is a side sectional view of an electric arc furnace incorporating the principles of the invention.
Figure 2:
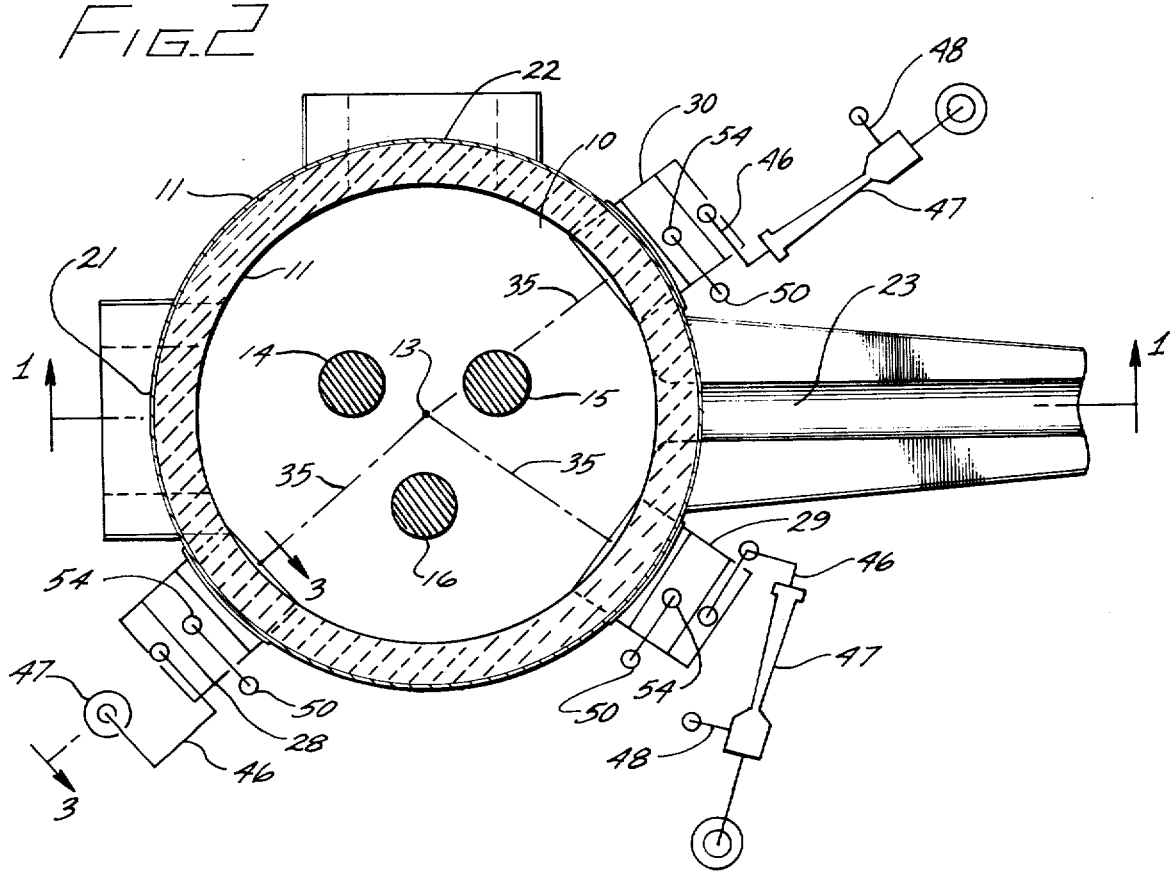
FIG. 2 is a top plan sectional view of the electric arc furnace of FIG. 1 taken along line 2—2 in FIG. 1.

In FIGS. 1 and 2 an electric arc furnace is shown. The furnace has a hearth 10, a cylindrical side wall 11, and a roof 12, that together form a generally cylindrical enclosure with a vertical central axis 13. Hearth 10, side wall 11, and roof 12 each comprises an inner refractory shell supported by an outer steel frame. Electrodes 14, 15, and 16 extend vertically downward through roof 12 into the center of the enclosure. Electrical energy is applied to electrodes 14 through 16 by a high power input electrical system represented as a box 17. Electrodes 14 through 16 can be raised and lowered by means not shown. Roof 12 can be removed to charge the furnace with scrap steel or other scrap metal to be melted and refined. Doors 21 and 22 offer access to the interior of the furnace for the purpose of adding constituent elements to the metal during melting and/or refining. The refined metal is removed from the furnace through a tap hole and a spout 23 after the entire furnace is tilted by means not shown. The hearth line of the furnace is represented at 24. A conduit 25, which opens into the interior of the furnace where side wall 11 meets roof 12, is connected to a so-called "baghouse," which is required by the San Bernardino County Air Pollution Control District in California. An exhauster, not shown, is connected to conduit 25 to draw the products of combustion generated during operation out of the interior of the furnace to the baghouse, where these products are treated to meet air pollution standards.

As described to this point, the furnace is conventional. According to the invention, carbonaceous fluid fuel burners 28, 29, and 30 are coupled to the interior of the furnace. Burners 28, 29, and 30 are designed for natural gas, propane, or LPG, but other fuels such as fuel oil could be used with the same or a different suitable burner design. In FIGS. 3 and 4, burner 28 is depicted in detail. A rectangular portion of the refractory shell of side wall 11 is removed and replaced by a steel housing 31, which is welded to the steel frame represented at 32. Housing 31 is open on the side facing the interior of the furnace and is closed on the other sides except for coupling holes. A block 33 of refractory material suitable for the temperature of a natural gas flame is permanently built into housing 31 on site. Block 33 is as close to the bottom of the furnace as possible without plugging up passage 34 with scrap during melting and refining. In molding block 33, an elongated, radially inward, downwardly directed passage 34 is formed along an axis 35, which intersects vertical axis 13 and forms an angle therewith that is sufficient to direct the combustion gases to the floor of the hearth. In one embodiment, this angle is about 50°. Passage 34 has an inlet 37, an outlet 38, a cylindrical section 39, and a circular conical section 40. A coupling hole in housing 31 coincides with inlet 37. Section 39 couples inlet 37 to the narrow end of section 40. The wide end of section 40, which forms outlet 38, opens into the interior of the furnace in the plane of the interior surface of side wall 11. The axes of sections 39 and 40 coincide with axis 35. A conduit 46 and a venturi section 47 are connected in series from a large air blower, discussed below in connection with FIG. 5, to inlet 37. A conduit 48 is connected from a source of natural gas, discussed below in connection with FIG. 5, to the throat of a venturi section 47, where the gas is mixed with air to form a combustible mixture. The combustible mixture enters passage 34 at inlet 37 and flows along axis 35 toward outlet 38.

A pilot passage 49 is formed in block 33 between the top of the burner and passage 34. A coupling hole in the top of housing 31 coincides with passage 49. A pilot air conduit 50 extends between an air blower and pilot passage 49. A cock 51 to control pilot air flow and a venturi section 52 are connected in series with conduit 50. A conduit 53 connects a source of natural gas to the throat of venturi section 52 where a combustible pilot mixture is formed. A conventional pilot unit 54 having a spark igniter fits in passage 49. Conduit 50 is connected to pilot unit 54. As the combustible pilot mixture enters passage 34 through unit 54, it is ignited by sparks generated by unit 54, thereby igniting the main stream of combustible mixture from conduit 45 as it flows along axis 35 near inlet 37. The burning mixture is directed by passage 34 into the interior of the furnace in a radially inward, downward direction that intersects axis 13 in hearth 10.

Burners 29 and 30 are identical to burner 28 except for different plumbing layouts, which are dictated by space availability. The plumbing arrangements are indicated in FIG. 2 in schematic form, like numerals being employed to designate like components of the plumbing in connection with each of burners 28, 29, and 30.

When the furnace is charged, the scrap steel lies in a heap on hearth 10 that extends upwardly to partially or completely fill the interior of the furnace. During the first phase of the process, the scrap meets and sinks into hearth 10. During the second phase of the process, the molten metal in hearth 10 is refined. Due to the space between pieces of scrap, the scrap metal charge occupies a much larger volume than the molten metal.

By directing the burning mixture in a radially inward, downward direction, the charge in the furnace is heated more uniformly and efficiently during the melting phase. The flame fronts emanating from burners 28, 29, and 30 impinge directly upon the base of the scrap heap. The hot products of combustion are drawn from the base of the scrap heap upwardly through the spaces in the heap by conduit 25. Thus, the heat generated by burners 28, 29, and 30 sweeps downwardly into hearth 10 along a path that then curves upward into the remainder of the furnace interior. As a result of the proximity of the flame front, the base of the heap is at a somewhat higher temperature than the top, but a relatively small temperature gradient exists from top to bottom of the heap by virtue of the thorough exposure of the entire heap to the hot products of combustion. The formation of bridging structures being pieces of scrap, which could later drop into the molten metal bath and cause splashing, is discouraged by the uniform heating pattern.

Burners 28, 29, and 30 are recessed outwardly from the surface of side wall 11, in order to maximize completion of the combustion process by the time the mixture meets the scrap heap. This reduces oxidation of the constituent elements in the scrap because the available oxygen has combined with the hydrocarbons prior to contacting the scrap.

The burners could be operated in a number of different timing modes relative to the electrodes during the melting phase of the process. First, the burners could be operated before the electrodes are energized to preheat the scrap metal without completely melting it, after which the burners are turned off to permit the electrodes to complete the melting phase. Second, the burners could be operated before the electrodes are energized until the scrap is completely melted, after which the burners are turned off. Third, the burners could be operated without the electrodes to preheat the scrap metal to a temperature below its melting point after which the electrodes are energized to complete the melting phase jointly with the burners. In any case, unless a power failure occurs, the electrodes are generally used to refine the metal without the burners, because electrical heating is more efficient during the refining phase.

If the second mode of burner operation is used, the heating pattern described above causes the scrap heap to melt from the bottom up so the heap gradually sinks into the molten metal bath in hearth 10 without appreciable splashing of molten metal. Generally, the electrodes of an electric arc furnace are vertically adjustable so they can be lowered during operation as the metal melts and sinks into the hearth to maintain contact between the metal and the electrodes. Thus, in the first and second modes of burner operation, electrode consumption by oxidation can be avoided by raising the electrodes out of the scrap metal heap. In the third mode of burner operation, electrode consumption by oxidation is also prevented or minimized by the downward orientation of axis 35 of the burners.

In FIG. 5, the apparatus for forming the combustible mixture is shown schematically. A single air blower 60 serves each of burners 28, 29, and 30. Air from blower 60 is distributed by a manifold 61 to venturi section 47 for each of burners 28, 29, and 30. A natural gas main 62 is connected by a manifold 63 to conventional ratio regulators 64 individual to each of burners 28, 29, and 30. Natural gas from main 62 passes through each of regulators 64 to the corresponding venturi section 47, where it is mixed with air from blower 60. A small line 65 is connected from each of the air conduits between manifold 61 and venturi section 47 to the corresponding regulator 64 to provide an indication of the air flow through such conduit. Each of regulators 64 controls the flow of natural gas passing to the corresponding venturi section 47 to maintain a constant pressure ratio between natural gas and air. Depending upon the location of the scrap within the furnace, the air flow distribution to burners 28, 29, and 30 varies. For example, if a piece of scrap blocks the outlet of one of the burner passages, substantially less air is distributed to the blocked burner than to the burners that remain unblocked. By individually regulating the gas supplied to each of burners 28, 29, and 30 in the described manner, a constant gas-air ratio is maintained in the combustible mixture supplied to each of burners 28, 29, and 30, despite variations in the air distribution from blower 60 to the various burners.

Since gas main 62 is stationary and tilts to permit the charge to be tapped at the end of the process, a flexible or expandable section, such as a looped rubber hose, must be provided in the natural gas connections to the burners. Preferably, these sections are in between regulators 64 and venturi sections 47, and the entire air supply system, blower 60, manifold 61, venturi sections 47, and conduit 46 are mounted to tilt with the furnace, so flexible sections are not needed in the air connections.

It is particularly advantageous to employ a combustible mixture that is rich in natural gas. In other words, regulators 64 are adjusted to provide a gas-to-air ratio that is larger than the gas-to-air ratio for complete gas combustion. The most effective gas-to-air ratio is one that is substantially 8% higher than the ratio for complete gas combustion. Assuming complete gas combustion occurs at a gas-to-air ratio of substantially 1:10, the most effective gas-to-air ratio is substantially 1.08:10. The use of a gas rich combustible mixture reduces the temperature of the flame front and thereby further reduces the temperature gradient from bottom to top of the scrap heap, without appreciably impairing heat generation. Moreover, the consumption of the electrodes by oxidation and the oxidation of carbon and other constituent elements in the scrap are reduced because of the absence of oxygen from the products of combustion. This eliminates or minimizes the need for supplementing the scrap metal with such constituent elements during the refining phase. The use of a fuel rich mixture in the described process, which is the invention of John H. Hirt and James F. Rice, is disclosed and claimed in the copending application filed on even date herewith and entitled METHOD FOR AUGMENTING THE ELECTRICALLY GENERATED HEAT SUPPLIED TO THE CHARGE IN AN ELECTRIC ARC FURNACE, Ser. No. 393,721.

In FIG. 6 is shown a modified version of one of burners 28, 29, and 30. As in the version disclosed in FIG. 3, a rectangular portion of the refractory shell of side wall 11 is removed and replaced by a steel housing 70. Housing 70 is open on the side facing the interior of the furnace, and is closed on the other sides except for coupling holes. A block 71 of refractory material suitable for the temperature of a natural gas flame is built offsite of the furnace so as to fit into housing 70. Block 71 has a passage 72 identical to passage 34 in the version in FIG. 3. A pilot passage 73 into which a pilot unit such as unit 54 in FIG. 3 is inserted, extends horizontally from the back of block 71 to passage 72. A steel plate 74 fits against the back surface of block 71. The heads of bolts 75 and 76, which are welded to plate 74, are imbedded in block 71 to anchor plate 74 thereto. The threaded ends of bolts 75 and 76 extend horizontally rearward from block 71. Plate 74 has an inwardly turned lip 77 at the entrance of passage 73, and a coupling hole 78 surrounded by a mounting collar 79. Block 71 is slid into housing 70 in the direction of the arrows in FIG. 6. Bolts 75 and 76 pass through mounting brackets 80 and 81, respectively, on the outside of housing 70 where they are secured by nuts not shown. A tubular fitting 82, welded to housing 70, extends into lip 77 and becomes axially aligned with passage 73. The pilot unit, which is not shown, is secured to fitting 82 by a threaded connection. In this version of the burner, block 71 can be simply replaced en toto when it becomes ineffective due to prolonged use.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, although the invention is described in the context of processing scrap steel, other metals may be processed as well. Further, although the invention is described with natural gas as the fuel and air as the oxidizing agent, other types of fuel, such as propane, LPG, and fuel oil and other types of oxidizing agents, such as pure oxygen, could be employed.

What is claimed is:

1. An electric arc furnace comprising:
   a furnace having a hearth, a side wall surrounding the hearth, and a roof over the side wall to define a generally cylindrical enclosure with a vertical central axis;
   a plurality of electrodes extending vertically through the roof into the center of the enclosure;
   a source of carbonaceous fluid fuel;
   a source of oxygen;
   means for mixing the fuel and the oxygen to form a combustible mixture;
   means for igniting the combustible mixture; and
   a burner for directing the ignited combustible mixture into the enclosure in a downward and radially inward direction that intersects the central axis, the burner having an elongated passage outwardly disposed from the side wall of the furnace, the passage having an inlet coupled to the mixing means, an outlet opening into the enclosure at the side wall, and a longitudinal axis extending downwardly from the inlet through the outlet to intersect the central axis of the furnace in the hearth.

2. The furnace of claim 1, in which the mixing means maintains a fuel rich combustible mixture.

3. The furnace of claim 1, in which the mixing means comprises a first conduit for coupling the source of oxygen to the igniting means, a second conduit for coupling the source of fuel to the igniting means, and a ratio regulator disposed in the second conduit to control the flow rate through the second conduit responsive to the pressure in the first conduit to maintain a constant pressure ratio between the fuel and the oxygen such that the combustible mixture is fuel rich.

4. The furnace of claim 1, in which the directing means directs the ignited combustible mixture into the enclosure in a downward and radially inward direction from a plurality of points at the side wall of the furnace.

5. The furnace of claim 1, in which the passage is conical and the outlet is larger than the inlet.

6. The furnace of claim 5, in which the passage has a cylindrical section and a diverging conical section connected in series from the inlet to the outlet.

7. The furnace of claim 1, additionally comprising an exhaust conduit connected to the enclosure in the vicinity of the roof.

8. An electric arc furnace comprising:
a furnace having a hearth, a side wall surrounding the hearth, and a roof over the side wall to define an enclosure for a charge of metal to be melted and refined;
a plurality of electrodes extending vertically through the roof into the enclosure;
at least one burner recessed from the surface of the side wall, each burner having an elongated passage with an inlet spaced outwardly from the surface of the side wall and an outlet lying in the plane of the surface of the side wall, the passage of each burner being oriented in a downward direction toward the hearth;
a source of carbonaceous fluid fuel;
a source of oxygen;
means for coupling the fuel and the oxygen to the inlet of the passage; and
means for igniting the fuel and the oxygen near the inlet of the passage.

9. The furnace of claim 8, in which the burners are at least three in number and their passages are oriented toward a common point in the hearth.

10. The furnace of claim 9, in which the passages are formed in blocks of refractory material that fit into openings in the side wall.

11. The furnace of claim 10, in which the side wall has a metal frame and the blocks of refractory material are supported in metal housings attached to the frame.

12. An electric arc furnace comprising:
a furnace having a hearth, a side wall surrounding the hearth, and a roof over the side wall to define an enclosure for metal to be melted and refined;
a plurality of electrodes extending vertically through the roof into the enclosure;
a plurality of burners each having an outlet opening into the enclosure and an inlet;
a source of carbonaceous fluid fuel;
a source of oxygen;
an oxygen conduit individual to each burner and connected between the source of oxygen and the inlet of such burner;
a fuel conduit individual to each burner and connected between the source of fuel and the inlet of such burner to supply with the oxygen a combustible mixture to the inlet; and
means responsive to the flow through each oxygen conduit for controlling the flow through the fuel conduit of the corresponding burner to maintain a constant fuel-oxygen ratio in the combustible mixture supplied to the inlet of each burner despite variations in the flow of the combustible mixture through the individual passages.

13. The furnace of claim 12, in which the source of oxygen is an air blower, the source of fuel is a natural gas main, and the controlling means are each ratio regulators responsive to the pressure in the corresponding oxygen conduits.

14. In an electric arc furnace having a hearth, a side wall surrounding the hearth, and a roof over the side wall to define a generally cylindrical enclosure with a vertical central axis in which a scrap heap is disposed; a plurality of electrodes extending vertically through the roof into the center of the enclosure; and means for withdrawing products of combustion from the top of the enclosure, the improvement comprising:
a source of natural gas;
a source of air;
means for mixing the natural gas and the air to form a combustible mixture;
a plurality of burners distributed along the side wall of the furnace and opening into the furnace at the bottom of the enclosure, to draw heat from the burners up through the spaces in the scrap heap and uniformly heat the scrap, each burner comprising an elongated downward and radially inwardly oriented passage having a longitudinal axis that intersects the central axis of the furnace within the hearth;
means for coupling the combustible mixture to the burners; and
means for igniting the combustible mixture in the burners.

15. The improvement of claim 14, in which the passage is conical and has an outlet larger than its inlet, the outlet opening into the furnace, the coupling means supplying the combustible mixture to the inlet, and the igniting means being near the inlet.

* * * * *

UNITED STATES PATENT AND TRADEMARK OFFICE
CERTIFICATE OF CORRECTION

PATENT NO. : 3,899,628 (Sheet 1 of 2)
DATED : August 12, 1975
INVENTOR(S) : John H. Hirt It is certified that error appears in the above-identified patent and that said Letters Patent are hereby corrected as shown below:

Col. 1, line 66, "of", first occurrence, should be --from--.

Col. 2, line 14, "individually" should be deleted;
line 28, "plan" should be deleted;
line 46, "comprises" should be --comprise--;

Col. 3, lines 18-20, "Block 33 is as close to the bottom of the furnace as possible without plugging up passage 34 with scrap during melting and refining." should be deleted here and inserted at line 25 between the period and "In";
line 39, "a" should be deleted between "of" and "venturi";
line 56, "conduit 45" should be --conduit 46--.

Col. 4, line 2, "meets" should be --melts--;
line 15, between "25" and the period should be inserted --by the exhauster connected to conduit 25--;
line 24, "being" should be --between--.

Col. 5, line 30, between "and" and "tilts" should be inserted --the furnace--.

Col. 7, line 8 (claim 4), "in which the" should be --additionally comprising a plurality of additional burners for--;
line 9, "means directs" should be deleted.

Col. 7, line 14 (claim 6), "5" should be --1--.

Col. 8, line 18 (claim 12), "passages" should be --burners--.

The following new claims should be added:

UNITED STATES PATENT AND TRADEMARK OFFICE
CERTIFICATE OF CORRECTION

PATENT NO. : 3,899,628
DATED : August 12, 1975 (Sheet 2 of 2)
INVENTOR(S) : John H. Hirt It is certified that error appears in the above-identified patent and that said Letters Patent are hereby corrected as shown below:

--16. The furnace of claim 8, in which the enclosure has a central vertical axis and the passage of each burner has a downwardly, inwardly directed longitudinal axis oriented to intersect the vertical central axis.--

--17. The furnace of claim 16, in which the longitudinal axis of the passage of each burner intersects the central axis within the hearth of the furnace.--

Signed and Sealed this thirtieth Day of December 1975

[SEAL]

Attest:

RUTH C. MASON
Attesting Officer

C. MARSHALL DANN
Commissioner of Patents and Trademarks